Nov. 2, 1965 W. R. HELLER ETAL 3,215,038
SOLID SOLUTION ELECTRO-OPTIC LIGHT SWITCH USING THE STARK EFFECT
Filed Nov. 15, 1961 2 Sheets-Sheet 1
FIG. 1
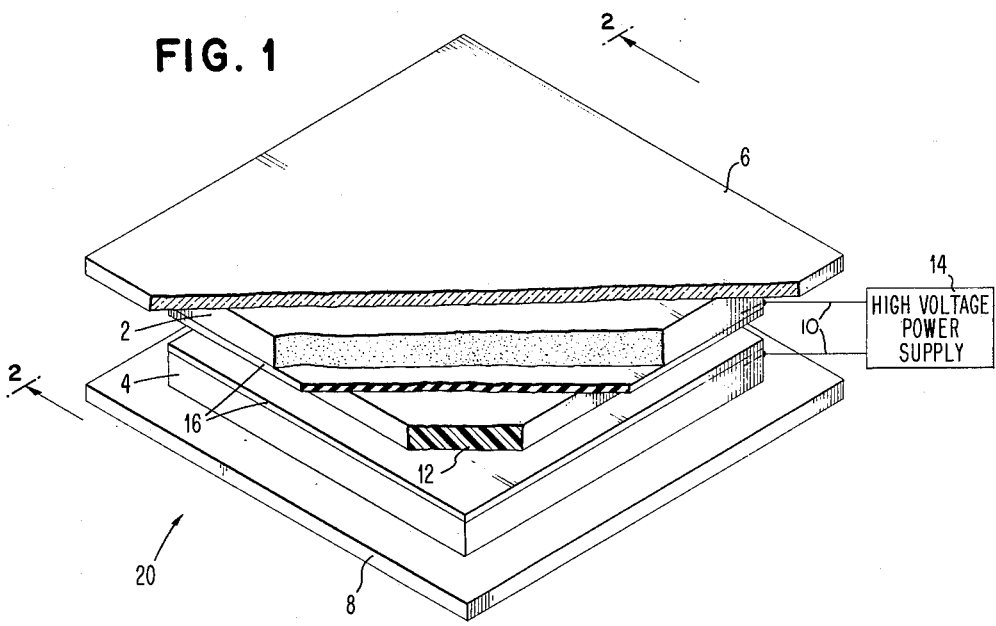
FIG. 2
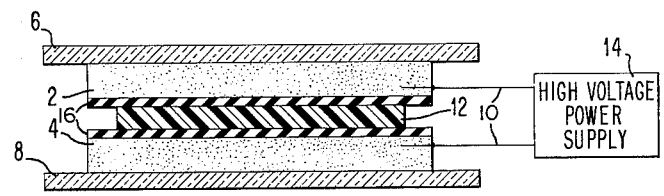
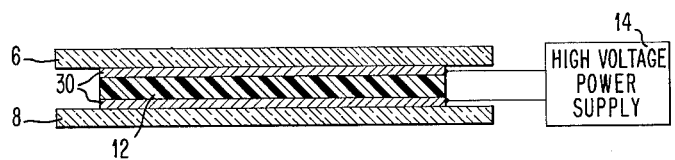
FIG. 3
INVENTORS
WILLIAM R. HELLER
JUNJI KUMAMOTO
JOHN C. POWERS, JR.
BY
ATTORNEY 3,215,038
SOLID SOLUTION ELECTRO-OPTIC LIGHT
SWITCH USING THE STARK EFFECT
William R. Heller, Pound Ridge, Junji Kumamoto, Yorktown Heights, and John C. Powers, Jr., Hartsdale, N.Y., assignors to International Business Machines Corporation, New York, N.Y., a corporation of New York
Filed Nov. 15, 1961, Ser. No. 152,584
13 Claims. (Cl. 88—61)

The present invention relates to an electro-optical element. More particularly, it relates to a light switch actuated by a strong electric field.

In modern scientific technology there are many areas where optical devices find wide application. In the field of communications the use of microwaves as a media for carrying information is very widespread and in this connection with the recent development of the "laser," electromagnetic waves in the visible spectrum or light waves are being used as an information carrier. In all sorts of data display systems light waves are the ultimate means of communicating the data to be displayed to an observer. Also, there have been proposed numerous types of optical computing circuits utilizing electroluminescent cells, photoconductors and the like. All of these systems have one problem in common, namely, controlling light waves rapidly and efficiently. One of the more basic requirements or elements for handling light waves is obviously the simple on-off switch. In the past, mechanical devices such as shutters, diaphragms and the like have been utilized for the purpose of passing or interrupting a light beam, however, in the areas designated above, the speeds with which the light beams must be shut off or otherwise interrupted are extremely great and normal mechanical means are not satisfactory for handling such speed requirements.

In recent years a number of devices have been developed for controlling the passage of a light beam by non-mechanical or electrical means. One of the more common utilizes the Kerr effect. Such an apparatus comprises two light polarizers each of which is capable of limiting the transmission of light therethrough to light whose polarization is in substantially one plane. The light polarizers are usually positioned such that the axis of polarization of each is displaced with respect to each other by about 90°. Between the polarizers there is positioned an electro-optical material which displays birefringent properties upon the application of an electric field and hence rotates the plane of polarization of the polarized light passing therethrough. The angles of polarization of the light polarizers can be so arranged that when the electro-optical material is energized by an applied voltage, polarized light entering the electro-optical material from the first polarizer is in effect rotated to the polarization angle of the second polarizer so that the light is transmitted through the second polarizer. If the electric field is not applied and rotation of the plane of polarization does not occur the cooperative action of the two polarizers is effective, as is well known, to prevent the transmission of light through the second polarizer. Such a system of light switching is set forth and described in U.S. Patent 2,909,972. These systems, while operable, are physically complicated, bulky, expensive to manufacture and moreover they do not readily lend themselves to miniaturization as where it might be desired to have a large number of such elements within a small space. The miniaturization aspect can be quite important in computer applications and also in the communications field.

Past efforts to develop a suitable and efficient electro-optical element have for the most part been unsuccessful with the possible exception of the Kerr effect apparatus described above. One physical phenomenon or optical effect which has been known for many years but which never seems to have found any practical application is known as the Stark effect. This effect relates generally to the action of a strong electric field upon the spectral lines of a material subjected to its influence. The effect was originally observed in gases and only recently has been seen in certain solids. The usual observed effect is a shift in wavelength of some portions of the absorption and emission spectra of the material. While the effect has been known for many years no one has previously successfully constructed a practical device utilizing said effect for the purpose of light switching.

It has now been found that a light switching device can be made utilizing methyl red ($C_{15}H_{15}O_2N_3$)

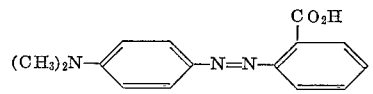

dissolved in polystyrene as an electro-optical element in a strong electric field when a source of monochromatic light is caused to pass through the element. Thus when an electric field is applied across the element a measurable change in the intensity of monochromatic light transmitted therethrough has been observed.

It is accordingly the primary object of the present invention to provide an electro-optic element.

It is a further object to provide such an element which will function as a high-speed light switch.

It is still a further object to provide such an element which together with other such elements combine to form a switching matrix for use in computers and the like.

The foregoing and other objects, features and advantages of the invention will be apparent from the following more particular description of a preferred embodiment of the invention, as illustrated in the accompanying drawings.

In the drawings:

FIG. 1 is a perspective view partly in section of one form of electro-optic element constructed in accordance with the present invention;

FIG. 2 is a cross section taken along line 2—2 of the device of FIG. 1;

FIG. 3 is a cross section of another embodiment of an electro-optic element according to the invention;

Figure 4:
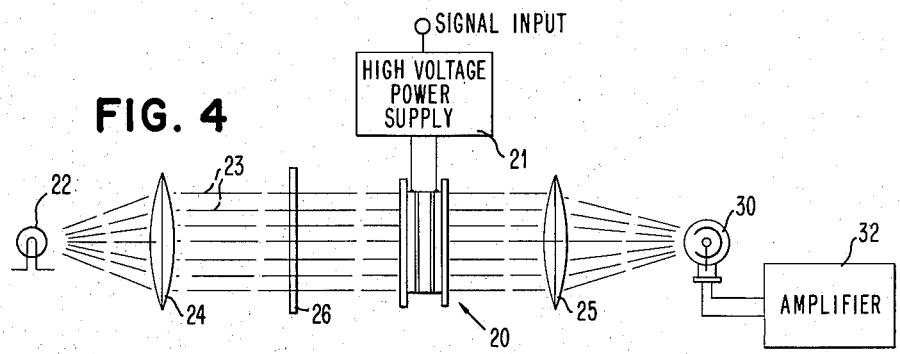
FIG. 4 is a schematic representation of a light switching system in accordance with the present invention.

The objects of the present invention are accomplished in general by an electro-optic element which comprises a thin film of polystyrene having dissolved therein methyl red and having on opposite sides thereof a pair of substantially transparent conductive electrodes.

The above device is particularly adapted for use as a light switch in combination with a suitable monochromatic light source, a source of high voltage for establishing a potential gradient across the element between the two transparent electrodes and a pickup device such as a photocell or the like.

For a more erudite explanation of the theory of operation of the device of the present invention, reference is made to application Serial No. 152,587, filed concurrently herewith, of W. R. Heller, entitled "Electro-Optical Devices," assigned to International Business Machines Corporation.

The theoretical considerations set forth in the above identified application suggested that the absorption spectrum of suitably constituted organic molecules would be shifted upon the application of an electric field. It was subsequently found that the organic dye methyl red ($C_{15}H_{15}O_2N_3$) dissolved in a polystyrene base would exhibit a Stark shift or change in coefficient of absorption when placed in a strong electric field. A principal problem in designing a device which would both allow measurement of the properties of the material as well as function as a light switch was solved by the structure disclosed in FIGS. 1 and 2. The structure disclosed in these figures depict one operating embodiment of the device. In order for the device to function, it is necessary to have a suitable transparent electrode which will permit the application of high voltage (10 kv. or more) across a short distance to produce fields in the neighborhood of 100,000 volts per centimeter.

The invention will be more particularly pointed out and described with reference to the drawings wherein like reference numerals refer to like portions. In the embodiment of FIG. 1 films of conducting gelatin 2 and 4 were cast upon glass slides 6 and 8, said films having thin copper wires 10 embedded therein. The above conducting gelatin is prepared by dissolving 7 grams of gelatin in 40 milliliters of hot water. Four grams of lithium chloride are added to the solution. The mixture is spread onto the desired surface, and allowed to stand until the gel has set. A thin (1 mil) Mylar (polyethylene terephthalate) film 16 was next applied to the surface of both the gelatin films 2 and 4 and the electro-optic material 12 sandwiched therebetween. A suitable high voltage power supply 14 is connected to the thin copper wires 10 and supplies the electric field for energizing the device.

It is to be understood that the transparent electrodes could be formed in other ways well known in the art. For example, a stannic oxide ($SnO_2$) film 30 which is conductive may be deposited upon the surface of two glass slides 6 and 8 by heating $SnCl_2$ powder in air in a manner well known in the art. FIG. 3 illustrates such a structure. A specific description of this process appears in the Journal of the Optical Society of America, vol. 48, No. 11, November 1958, on page 857. The only criteria that such conductive electrodes must have to function with the present invention are that they be electro-optically inert and characterized by the fact that their absorption spectra would not in any way interfere with the operation of the device at the wavelength at which it operates.

The organic dye methyl red is known to have an absorption spectrum which is sensitive to changes in solvent which fact suggested its use as an electro-optic material. In a preferred embodiment of the invention methyl red is cast in a polystyrene film in the proportion of 0.4 percent by weight of methyl red to 99.6 percent polystyrene. The film shown in FIG. 1 is approximately 5 mils in thickness.

In preparing such an electro-optic element methyl red is dissolved in benzene and added to a solution of polystyrene in benzene. The mixture is poured onto an electrode and the benzene is allowed to evaporate. Such films may also be prepared by other means well known in the art such as milling, rolling, pressing, molding and the like.

FIG. 4 shows a simplified system utilizing the present invention as a light switch. This system comprises a monochromatic light source 22 which for the electro-optic element 20 described previously would preferably have a 5350 A. wavelength, a collimating lens 24, an interference filter 26 for removing unwanted frequencies from light beam 23, the electro-optic element 20, a power supply 21 for selectively applying a field across element 20, a converging lens 25 and a photocell 30. The output of the photocell is preferably fed into a suitable amplifier 32 having detecting and amplifying circuitry sensitive to changes in light intensity falling on the photocell when a field is caused to be applied to the element 20 from the power supply 21.

Figure 5:
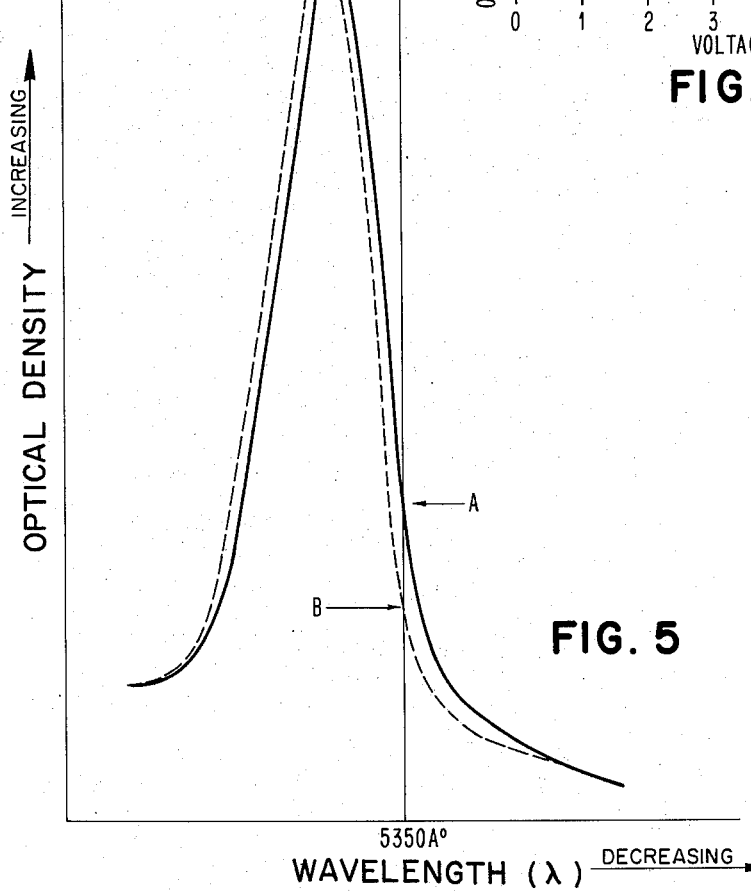
FIG. 5 is a graph showing wavelength ($\lambda$) plotted against optical density for the device of FIG. 1 showing the effect with and without the applied electric field.

The optical characteristics of the device of FIG. 1 are shown in the plot of FIG. 5. In this figure optical density is plotted versus wavelength for the two conditions of applying an electric field and not applying an electric field. The dotted line is a plot with no electric field applied to the electro-optic element and the solid line is a plot wherein a 10 kv. field is applied to the two electrodes.

Figure 6:
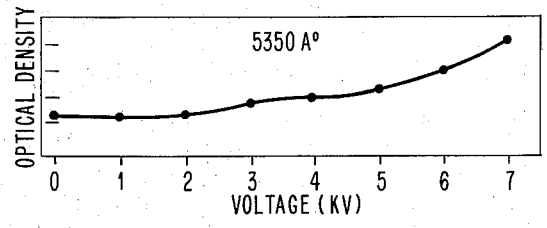
FIG. 6 is a graph of optical density versus voltage across the device at a significant fixed wavelength.

The data used for plotting curves of FIGS. 5 and 6 were obtained using a Cary model 14 spectrophotometer manufactured by the Applied Physics Corp. as a light source passing said light through the specimen which is placed in the spectrophotometer and measuring the transmitted light.

The greatest change in optical density was noted at approximately 5350 A. The optical density at this wavelength is indicated by the vertical distance A–B which is a measure of the change in optical density with and without the electric field.

FIG. 6 shows a plot at 5350 A. of the change in optical density versus voltage across the electro-optic element. It will be noted from this curve that the optical density increases concomitantly with the voltage.

It is known that the amount of light transmitted through a material is proportional to the optical density of said material according to the formula $$\text{Optical density} = \log \frac{I_0}{I} = Abc$$

where:

$I_0$ = percent transmission of the reference beam
$I$ = percent transmission of the sample beam
$A$ = molecular extinction coefficient of absorbing species
$b$ = light path length of the sample
$c$ = concentration of the absorbing species Therefore, the instant device can be used either as a light switch utilizing a suitable photocell and amplifying system or as a light modulating device. The latter use is suggested by the graph of FIG. 6 wherein a continuously variable electric field of from say 0 to 7 kilovolts/mil produces commensurate changes in the optical density and thus in the light transmitted therethrough. Such a light modulation scheme would have a number of possible uses one of which would be to modulate the amount of light reaching a "laser."

The speed of switching the instant device from a state of minimum to maximum optical density is extremely fast and is limited primarily by the electronic circuits utilized to supply the high voltage to the electrodes. Thus, the device can be quite readily used in optical switching circuits in the computer, communication and other allied fields.

A number of modifications and substitutions may be made in the disclosed device. For example, a number of different transparent electrodes may be used such as the two described or even a thin coating of vaporized metal on the glass slide. A number of different base or matrix materials may be used with the present invention such as polyvinyl chloride, polymethyl methacrylate, polyvinyl alcohol, polyvinyl acetate, polyethylene and others. Various combinations of these materials may also be used either as copolymers or physical mixtures. Furthermore, certain liquid or gaseous base or matrix materials may be used with the present invention.

Additional colored organic materials which have been used successfully in practicing the present invention include paranitrophenol

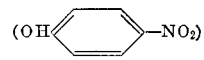

and paranitrosodimethylaniline

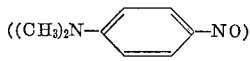

While the above example disclosed an electro-optic element 5 mils thick, it is obvious that other combinations of thickness and colored organic material-matrix concentrations will produce similar results. It has been found that an overall optical density of the electro-optic element of between 0.3 and 15 results in workable devices. It is, of course, further obvious that the thicker the individual element that is used, the greater will be the overall electrical field necessary to obtain desired field intensity levels.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electro-optic element comprising a thin film of a solid solution of about 0.4 percent by weight of methyl red ($C_{15}H_{15}O_2N_3$) and a transparent organic plastic solvent material capable of forming a solution with said methyl red and which when solidified forms a continuous phase solid solution, said element having on opposite sides thereof a pair of substantially transparent electrically conductive electrodes and means for connecting said electrodes to a high voltage source.

2. An electro-optic light switch which comprises a thin layer of polystyrene having methyl red ($C_{15}H_{15}O_2N_3$) dissolved therein said layer having transparent electrically conductive electrodes mounted in surface to surface contact on opposite sides thereof, the overall optical density of said layer being between about 0.3 and 15.

3. A device as set forth in claim 2 wherein each of the transparent, electrically conductive electrodes comprise a conducting gelatin cast upon the surface of a glass slide.

4. A device as set forth in claim 2 wherein the electrically conductive electrode comprises a stannic oxide film.

5. An electro-optic light switch comprising a multi-layered sandwich which includes serially a glass plate, a layer of electrically conducting gelatin, a sheet of polyethylene terephthalate film, a layer approximately 5 mils thick of a solid solution consisting of between about 0.4 percent by weight of methyl red ($C_{15}H_{15}O_2N_3$) dissolved in a polystyrene solvent, a layer of polyethylene terephthalate, a second layer of conducting gelatin film and a second glass slide and wherein suitable means are provided for connecting a source of electric power to the two conducting gelatin films.

6. A light switching system which comprises a monochromatic light source, a lens system for focusing the radiation from said light source into a beam, an electro-optic switching element interposed in said light beam comprising a layer of solid solution of methyl red ($C_{15}H_{15}O_2N_3$) dissolved in polystyrene having two transparent conductive electrodes on opposite sides thereof in surface to surface contact therewith and a photo-sensitive device located on the opposite side of said electro-optic element from the light source such that it receives the light beam transmitted through said element, and suitable amplifying and detecting means electrically connected to said photo-sensitive element for detecting a difference in light intensity passing through said electro-optic element when an electric field is applied thereto the overall optical density of said switching element being between about 0.3 and 15.

7. A light switching system as set forth in claim 6 wherein the monochromatic light source produces a wavelength of approximately 5350 A. and wherein the electro-optic element consists of a solid solution of 0.4 percent by weight of methyl red ($C_{15}H_{15}O_2N_3$) in polystyrene 5 mils thick.

8. An electro-optic element comprising a thin film formed from a mixture of methyl red ($C_{15}H_{15}O_2N_3$) and at least one organic resin selected from the group consisting of polystyrene, polyvinyl chloride, polymethyl methacrylate, polyvinyl alcohol and polyvinyl acetate, said mixture being formed into a thin transparent film and having on opposite sides of said film a pair of substantially transparent electrically conductive electrodes and means for connecting said electrodes to a high voltage source said film having an overall optical density of between 0.3 and 15.

9. An electro-optic element comprising a mixture of methyl red and polymethyl methacrylate formed into a thin substantially transparent film, said film having on opposite sides thereof a pair of substantially transparent electrically conductive electrodes and means for connecting said electrodes to a high voltage source said film having an overall optical density of between 0.3 and 15.

10. An electro-optic element comprising a mixture of methyl red and polyvinyl alcohol formed into a thin substantially transparent film, said film having on opposite sides thereof a pair of substantially transparent electrically conductive electrodes and means for connecting said electrodes to a high voltage source said film having an overall optical density of between 0.3 and 15.

11. An electro-optic element comprising a mixture of methyl red and polyvinyl acetate formed into a thin substantially transparent film, said film having on opposite sides thereof a pair of substantially transparent electrically conductive electrodes and means for connecting said electrodes to a high voltage source.

12. An electro-optic element comprising a thin film formed from a mixture of paranitrophenol

and at least one organic resin selected from the group consisting of polystyrene, polyvinyl chloride, polymethyl methacrylate, polyvinyl alcohol and polyvinyl acetate, said mixture being formed into a thin transparent film and having on opposite sides of said film a pair of substantially transparent electrically conductive electrodes and means for connecting said electrodes to a high voltage source said film having an overall optical density of between 0.3 and 15.

13. An electro-optic element comprising a thin film formed from a mixture of paranitrosodimethylaniline

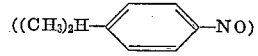

and at least one organic resin selected from the group consisting of polystyrene, polyvinyl chloride, polymethyl methacrylate, polyvinyl alcohol and polyvinyl acetate, said mixture being formed into a thin transparent film and having on opposite sides of said film a pair of substantially transparent electrically conductive electrodes and means for connecting said electrodes to a high voltage source said film having an overall optical density of between 0.3 and 15.

No references cited.

JEWELL H. PEDERSEN, *Primary Examiner.*

FREDERICK M. STRADER, *Examiner.*